(12) United States Patent
Lavi et al.

(10) Patent No.: US 9,313,291 B2
(45) Date of Patent: Apr. 12, 2016

(54) SYSTEMS AND METHODS FOR TRANSPARENT COMMUNICATION WITH BANDWIDTH CONSERVATION AND HTTP CACHING

(71) Applicant: DIALOGIC NETWORKS (ISRAEL) LTD., Petach Tikva (IL)

(72) Inventors: Benny Lavi, DN Mercaz (IL); Tal Inbar, Ramat-Gan (IL); Ehud Bart, Petach-Tikva (IL); Oded Katz, Sitryaa (IL)

(73) Assignee: Dialogic Corporation, Montreal, CA (US)

( * ) Notice: Subject to any disclaimer, the term of this patent is extended or adjusted under 35 U.S.C. 154(b) by 514 days.

(21) Appl. No.: 13/828,053

(22) Filed: Mar. 14, 2013

(65) Prior Publication Data

US 2014/0280471 A1 Sep. 18, 2014

(51) Int. Cl.
*G06F 15/16* (2006.01)
*H04L 29/08* (2006.01)

(52) U.S. Cl.
CPC .......... *H04L 67/2819* (2013.01); *H04L 67/289* (2013.01); *H04L 67/2823* (2013.01); *H04L 69/326* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 2008/0034119 A1* | 2/2008 | Verzunov et al. | 709/247 |
| 2012/0137210 A1* | 5/2012 | Dillon | 715/234 |
| 2014/0258390 A1* | 9/2014 | Annamalaisami et al. | 709/203 |

FOREIGN PATENT DOCUMENTS

WO 03088614 A1 10/2003

* cited by examiner

*Primary Examiner* — John B Walsh
(74) *Attorney, Agent, or Firm* — Chapin IP Law, LLC

(57) ABSTRACT

A communication channel in a network maintains client-server transparency while providing reduced bandwidth in the channel. A first and second node can communicate a compressed form of the object data between themselves in the channel. One of the first or second nodes hosts a cache database that can store, transparently to the client, the requested object data. The stored object data can be used to decompress the compressed object data communicated between the first and second node. One of the nodes can provide control signals to the other node to indicate whether the requested object data is stored in the cache database. This configuration preserves transparency between the client and the server while permitting reduced bandwidth usage between the first and second nodes via the compressed object data.

35 Claims, 4 Drawing Sheets

SYSTEMS AND METHODS FOR TRANSPARENT COMMUNICATION WITH BANDWIDTH CONSERVATION AND HTTP CACHING

STATEMENT REGARDING FEDERALLY SPONSORED RESEARCH OR DEVELOPMENT (Not Applicable)

BACKGROUND

The present disclosure relates generally to techniques for data transfer in a communication network, and relates more particularly to systems and methods for transparent communication between a client and a server with reduced bandwidth usage and HTTP caching.

Communication networks, including packet switched networks such as those that may operate with the Internet Protocol (IP), transfer packetized data over links that are established between nodes of the network. The links typically have bandwidth limitations for carrying data traffic that may be based on a number of factors, including physical limitations of a node or physical characteristics of a link, a volume of data traffic, quality of service, and other factors that may contribute to determining the throughput of a giving link or node in the network. Various techniques have been employed to attempt to increase available bandwidth, including data compression and bandwidth saving techniques that may be implemented in accordance with specific protocols that may attempt to limit the amount of data in a data transfer. Sometimes, equipment can be upgraded to have faster speeds, however the issue of bandwidth limitations is a constant design challenge for network engineers.

A typical network configuration for communicating data in a communication network involves the implementation of a client-server model. In such a model, a server receives and processes requests from the client and provides data to the client in response to the requests. Based on implementations of this model, one technique that can be used to reduce bandwidth usage is to implement an HTTP proxy cache at a location that is physically near to the client that is sending HTTP requests to the server. The HTTP proxy cache can store data in a location that is near the HTTP client to avoid significant amounts of data transfers over network links that have limited bandwidth. By storing data, such as media files that tend to be relatively large in size, at the HTTP proxy cache, transmission of large amounts of data over the communication network can be avoided, thereby conserving bandwidth in the communication network.

Requests by the HTTP client are received by the HTTP proxy cache, which retrieves the requested information from local storage, such as a proxy cache database, and provides the data to the HTTP client without having to forward the client request or retrieve data from other sources in the communication network. HTTP requests from the client are not passed on to remote network resources, such as media data file servers. Thus, the HTTP requests from the client terminate at the HTTP proxy cache, which responds to the client requests as a communication network endpoint.

The use of an HTTP proxy cache as described above has several main drawbacks. For example, since not all requests from the client reach the remote target server, processing that is ordinarily performed at the server is omitted. Without such processing at the server, the HTTP proxy cache may be made responsible for implementing important processes, such as copyright and digital rights management, such as may be dictated by the Digital Millennium Copyright Act, or other regulatory requirements for deploying copyright content within or outside of the United States. In addition, the server may implement application logic that relies on receiving client requests to operate properly. For example, the server may implement authorization and/or authentication logic, provide advertising content or license requirements that relies on user interaction for acceptance. Moreover, the server may implement application logic that relies on receipt of a client's request to accommodate billing or accounting practices with regard to content usage.

Another drawback of the proxy cache solution for conserving bandwidth concerns core cellular networks that may be used by a client for web browsing. The web browsing information may be provided to the user through a proxy cache, over a particular route that depends on the user's location in relation to cell towers. If the user changes location, the route taken by the web browsing information through the core cellular network may change. In such an event, the TCP connection is typically torn down, which may cause the user to loose their browsing session, which is typically restarted to continue web browsing.

SUMMARY

The present disclosure provides systems and methods for conserving bandwidth with the use of an HTTP transparent cache that overcomes or avoids the drawbacks of traditionally implemented HTTP proxy caches. The transparent cache works with a communication link that is controlled to reduce traffic when requested data is determined to be locally available to a client.

According to an aspect of the present disclosure, a first network node in a communication network hosts a transparent cache database that can store one or more objects or portions of one or more objects. For example, the transparent cache database can store TCP segments that make up some or all of an object that is the target of a client request. The first network node forwards the client request to a server via a second network node. The first network node also signals the second network node to indicate that the transparent cache database has a copy of the requested TCP segments that make up the requested object or portion of that object. The server receives the request and provides TCP segments representing the requested object or portion of that object. The second network node receives the TCP segments representing the object or portion of the object, and in accordance with the signals from the first network node, compresses and transmits or directly transmits (passes) the TCP segments to the first network node. The compressed TCP segments takes up less bandwidth than directly transmitted or passed TCP segments. Upon receipt from the second network node, the first network node processes the TCP segments, and decompresses the compressed TCP segments, or avoids decompressing the directly transmitted TCP segments. After being processed, the TCP segments collected at the first node that are responsive to the client request are provided to the client. The above described configuration permits object data to be retrieved using less bandwidth when at least some of the transmitted TCP segments are compressed, meaning that a local copy of those TCP segments is available in the transparent cache database.

In accordance with another aspect of the present disclosure, the first network node and the second network node communicate with a dedicated protocol that may not be common to other nodes or node connections. The dedicated protocol permits the first network node to signal the second network node regarding the status of the transparent cache database without interfering with other messages. According to this aspect, the communication messages between the first network node and the second network node that use the dedicated protocol also terminate the dedicated protocol. The dedicated protocol can be used to carry signals between the first and second network nodes that help to determine when the second network node should perform compression on the object data. The second network node can set a flag, for example, based on the signaling from the first network node, which flag can indicate whether compression should be performed on the object data retrieved from the server.

According to another aspect of the present disclosure, an access node in a communication network hosts a transparent cache database that is located nearby the client. The transparent cache database can store some or all of an object that was earlier downloaded from a server that manages the object. The access node can receive a request from the client for the object or some portion(s) thereof. The access node determines if the request is for an object that is wholly or partially stored in the transparent cache database of the access node and forwards the request to a core node to which the access node is connected through the communication network. The access node also forwards a control message to the core node to indicate the portions of the requested object that are in the transparent cache database. The core node forwards the request to the server, thereby forming a complete HTTP request path from the client to the server, where the server provides TCP termination.

The core node receives the response from the server that contains the requested object data. The core node, in accordance with the control message received from the access node, determines the object data that should be compressed before being sent to the access node, and determines the object data that should be sent to the access node uncompressed. Typically, where specific object data is stored in the transparent cache database, corresponding object data received at the core node from the server is transmitted to the access node in a compressed state. Where specific object data is not stored locally in the transparent cache database, corresponding object data received at the core node from the server is transmitted to the access node in an uncompressed state. The access node processes the compressed object data and/or uncompressed object data received from the core node to compose uncompressed object data that is forwarded to the client as a response to the request for the object data. When the access node processes compressed object data, a decompression process is employed that uses the object data that is stored in the transparent cache database to reconstitute or decompress the compressed object data received from the core node. In accordance with the above-described configuration, HTTP requests are delivered from the client to the server, and responses are delivered from the server to the client, to maintain transparency between the client and the server. In addition, when at least some of the requested object data has previously been provided to the transparent cache database in the access node, the corresponding object data retrieved from the server can be sent from the core node to the access node in compressed format, thereby using less bandwidth.

According to another aspect of the present disclosure, segments of the compressed object data sent from the core node to the access node are identified using a compressed format. The identified segments can be matched to corresponding uncompressed object segments stored in the transparent cache database. The identified segments can be reconstituted or decompressed using the segments of the cached object that correspond to the identified segments received from the core node. For example, the compressed segments of the object data received from the core node can be used to reference segments of the object stored in the transparent cache database. The object segments in the transparent cache database that are so referenced can be accessed to decompress or reconstitute the compressed segments of the object data, which forms the uncompressed object data that can be delivered to the client to fulfill the client request. This technique saves bandwidth by using the compressed object data for transmission from the core node to the access node, whereupon the object data stored in the transparent cache database can be referenced using the compressed object data to decompress or reconstitute the object data at the access node for delivery to the client.

According to another aspect, a compressed object data response transmitted from the core node to the access node includes metadata that specifies one or more segments of the requested object that are represented by the compressed response. The metadata permits the response to be compressed to a form that identifies one or more segments of the object in the transparent cache database of the access node, without sending the actual segments of the object across the communication link from the core node to the access node.

According to another aspect of the present disclosure, the access node uses a compressed response from the core node to reference specified segments of the object in the transparent cache database. If an error occurs when the access node attempts to retrieve segments of the object from the transparent cache database to decompress or reconstitute the compressed response from the core node, the access node can send a control message to the core node to indicate the segments of the object for which an error was generated. These segments can be retrieved from the server and forwarded to the access node via the core node in accordance with a normal retrieval mode. For example, the server can send the object segments to the client via the core node and the access node transparently, such as in an uncompressed or normal format. The object segments can also be stored in the transparent cache database, which operation is transparent to the client.

According to another aspect of the present disclosure, the access node and the core node each maintain a list of requests and responses to track and maintain communication sequences. For example, the access node and the core node use the maintained lists to match client requests with server responses. In the case of the core node, the tracked requests or responses can be flagged to indicate that a response associated with a flagged request, or a flagged response, should be compressed upon being sent across the communication link to the access node. The requests or responses maintained in the list at the core node can be flagged or not flagged based on control messages received from the access node that indicate whether the requested object is stored in the transparent cache database at the access node. Accordingly, the core node uses the lists of requests and/or responses to logically indicate when a response should be compressed or not compressed prior to being transmitted across the communication link to the access node.

BRIEF DESCRIPTION OF THE SEVERAL VIEWS OF THE DRAWINGS

The present disclosure is described in greater detail below, with reference to the accompanying drawings, in which.

DETAILED DESCRIPTION

The present disclosure provides systems and methods for conserving bandwidth in communication network data transmissions while preserving transparency between a client and a server. The amount of data transferred between nodes in a communication network in response to a client request forwarded to a server can be reduced when a transparent cache database is implemented near the client in accordance with the disclosed systems and methods.

The present disclosure implements a transparent cache database at a site that is local to one or more client terminals that generate requests to resources in the communication network, which resources may be hosted by one or more network servers, for example. The transparent cache database may include a storage facility that stores data that may be responsive to requests submitted by the clients. In accordance with the present disclosure, a client terminal generates a request for at least a portion of an object from a communication network connected resource, such as by submitting a request to a server for media content, which media content can be provided to the client terminal as a media data file, for example. One or more object segments that comprise the media data file, being stored in the transparent cache database, can be delivered to the client terminal without requiring those segments to be downloaded from the server via links in the communication network that may have limited bandwidth. In addition, the client request is transmitted to the server, which provides a response that is returned to the client terminal, so that the transparent cache database operations are transparent to the client and the server. Accordingly, an end-to-end TCP connection can be preserved between the client and the server, while the client is provided with the requested content on a local basis.

Figure 1:
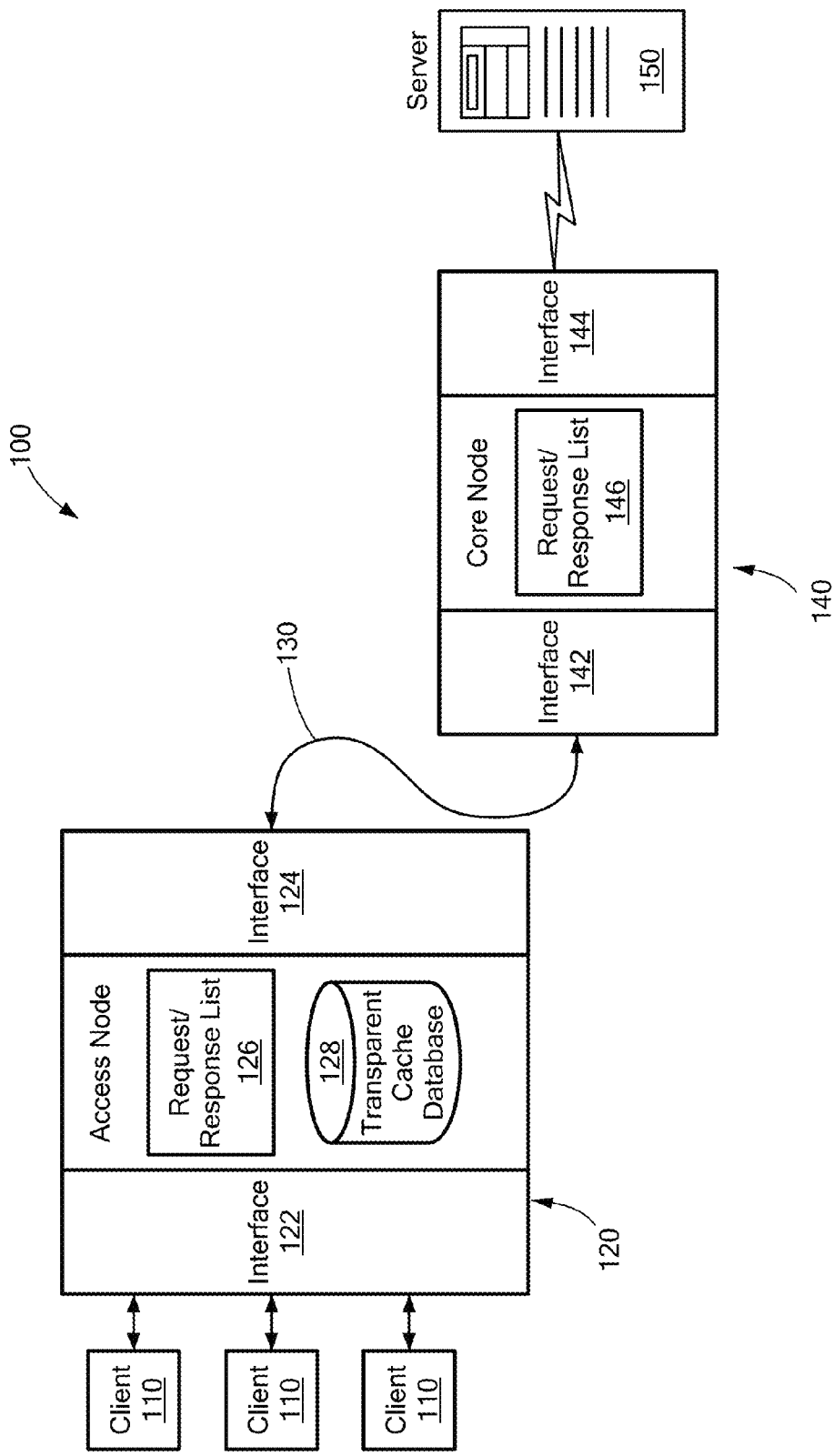
FIG. 1 is a block diagram illustrating a communication network according to an exemplary embodiment of the present disclosure.

Referring now to FIG. 1, a schematic block diagram of a transparent cache architecture in a communication network 100 is illustrated in accordance with an exemplary embodiment of the present disclosure. Network 100 includes a plurality of clients 110 that are network endpoints that transmit requests and receive responses via network 100, typically via a client browser that is installed at each client. The requests from clients 110 are directed to a server 150, which may be a web server, for example, and which provides responses according to the requests being made.

Network 100 also includes an access node 120 that includes interfaces 122, 124 for transmitting and receiving IP packets. Interface 122 transmits and receives packets to/from clients 110, and interface 124 transmits and receives packets to/from a core node 140 over a communication link 130. Access node 120 also includes a transparent cache database 128 that provides storage for objects and portions of objects that may be requested by one or more of clients 110. Access node 120 further includes a request/response list 126, which tracks client requests and responses received from network connected resources, such as a server 150. Request/response list 126 is used to pair requests with responses to track network communications. For example, access node 120 compares received responses against requests that are tracked in request/response list 126 and removes matching request/response pairs from the list to indicate a successful communication session. Access node 120 may implement one or more timers (not shown) that are started when a request is received at interface 122 and/or forwarded by interface 124. If a response is not received for a given request by the time an associated timer reaches a specified value, access node 120 may mark the request as having an error condition and/or may remove the request from request/response list 126.

Access node 120 is connected to core node 140 via communication link 130. Communication link 130 provides a communication network pathway between access node 120 and core node 140 for which bandwidth is conserved in accordance with the present disclosure. Core node 140 in network 100 includes interfaces 142, 144 for transmitting and receiving IP packets. Interface 124 of access node 120 can transmit and receive packets to/from an interface 142 of core node 140. Core node 140 includes a request/response list 146 that tracks requests and responses that are processed by core node 140 to contribute to verifying proper communication network operation, in part by matching responses received from server 150 with requests received from a client 110 or access node 120. Core node 140 also includes an interface 144 that provides a connection to server 150 to permit information to be sent and received between interface 144 and server 150.

In operation, network 100 permits data and messages to be exchanged among clients 110, access node 120, core node 140 and server 150. In a typical operation, client 110 sends a request to server 150, which is routed to interface 122 and can be processed by access node 120. The request may include a destination address that identifies server 150. Access node 120 inspects the request and determines if portions of the object requested by client 110 are stored in transparent cache database 128. Access node 120 updates request/response list 126 with the request, and routes the request via interface 124 through communication link 130 to interface 142 of core node 140. If portions of the requested object were located at access node 120, a control message is sent to core node 140 to indicate a "HIT" for transparent cache database 128.

Core node 140 receives the request from client 110 and updates request/response list 146 with the request, and routes the request with the IP address of the HTTP client 110 via interface 144 to server 150. Core node 140 receives the control message from access node 120, indicating the segments of the object that are presently available in transparent cache database 128. Core node 140 updates request/response list 146 with information to indicate the segments of the object that are located in transparent cache database 128. For example, core node 140 may set a flag in an entry in request/response list 146 that refers to one or more object segments in transparent cache database 128. Alternately, or in addition, core node 140 may store identifiers of the object segments that were located in transparent cache database 128 in one or more entries in request/response list 146. In any event, the object segments located in transparent cache database 128 are noted by core node 140 via the control message sent from access node 120 containing that information.

Server 150 receives the request originally from client 110, as routed through access node 120 and core node 140, and processes the request to determine a response for the requested object. The response provided by server 150 can be in the form or one or more object segments that each make up at least a portion of the object requested by client 110. Server 150 addresses the response to client 110, which response is routed to and processed by core node 140. Core node 140 inspects the response and determines if the object segments returned by server 150 should be compressed in accordance with the information provided in the control message from access node 120. For example, core node 140 may determine that a number of object segments in the response are already located in transparent cache database 128, based on the content of the control message from access node 120. Core node 140 compresses those object segments identified in the control message from access node 120, and leaves uncompressed object segments that were not found in transparent cache database 128 by access node 120. Core node 140 then forwards the response containing the compressed or uncompressed object segments via interface 142 to interface 124 of access node 120 over communication link 130. Core node 140 updates request/response list 146 to reflect the object segments that were sent, compressed or uncompressed, to access node 120. Since a single request may be made up of a number of object segments, core node may retain an entry in request/response list 146 for object segments that might not yet have been returned from server 150 in response to the request.

Access node 120 receives the response from core node 140 at interface 124 and processes the response to update request/response list 126 in accordance with the object segments identified in the response. Access node 120 may not necessarily remove an entry from request/response list upon receipt of the response from core node 140, but may revise a corresponding entry to note the object segments that were received, in case other object segments are expected, for example. Access node 120 reconstitutes the compresses object segments to be in their original form provided by server 150, by using object segment identifiers in the compressed object segments to retrieve the appropriate object segments from transparent cache database 128. The reconstituted object segments are returned to client 110 in response to the original HTTP request made by client 110. Accordingly, the operations of access node 120 and core node 140 are transparent to client 110.

Request/response list 126 in access node 120 and request/response list 146 and core node 140 are each updated upon the receipt of a request or a response. For example, request/response list 126 can be updated with an entry upon receiving a request from client 110 via interface 122. When a response is received from server 150 at access node 120 on interface 124, the response can be checked against request/response list 126 to match the response with the original request. If additional object segments remain to be retrieved, the request can be maintained in request/response list 126, and can be updated to reflect the receipt of the identified object segments transmitted by core node 140 in either compressed or uncompressed form. Accordingly, the entry in request/response list 126 for the request can be used to track the full response from server 150, if the same is provided in multiple operations.

Request/response lists 146 operates similarly in core node 140 by maintaining a list of requests received via interface 142, and matching those requests with responses received from server 150 via interface 144. In accordance with the above described operation of request/response list 126, 146, requests and responses can be tracked at each of access node 120 and core node 140 to verify proper network operation, as well as to implement embodiments of the disclosed systems and methods as described in greater detail below.

Figure 2:
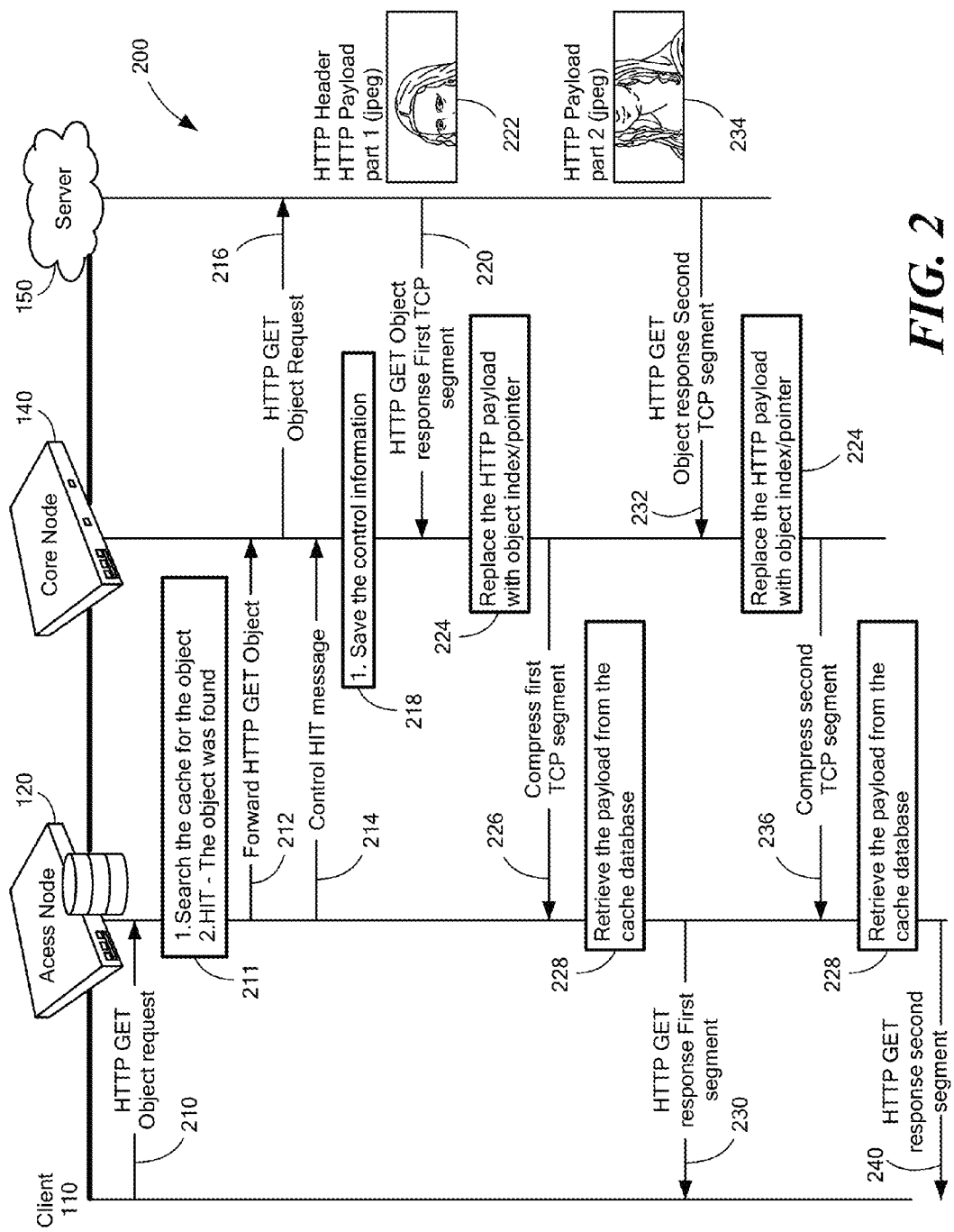
FIG. 2 is a request/response diagram illustrating aspects of an exemplary embodiment of the present disclosure.

Referring now also to FIG. 2, a request/response diagram 200 is illustrated that shows an exemplary embodiment of the present disclosure. FIG. 2 illustrates a request 210 that originates from client 110 and terminates at server 150, as well as a response that originates at server 150 and terminates at client 110. In the illustrated exemplary embodiment, client 110 issues request 210 as an HTTP get object request that is transmitted to server 150 via access node 120 and core node 140. Request 210 specifies an object or a portion of an object, such as a picture, a document, a video clip, or any other type of object or object portion, that is to be retrieved from remote server 150. The request may reference a single object segment or a number of object segments that are used to make up an entire object that is requested from server 150. Access node 120 and core node 140 are configured to handle requests for entire objects that include a number of segments or portions, as well as requests for single object segments or portions of an object. Accordingly, transparent cache database 128 can store entire objects or portions of objects, including object segments, which may be referenced by one or more identifiers. Also, it should be apparent that a number of devices may be employed between client 110, access node 120, core node 140 and/or server 150 to implement the communication network and network operations, such as, for example, a redirecting device (not shown) such as a router, a switch, or any other network device that facilitates operation of network 100.

Access node 120 monitors HTTP traffic and identifies and processes request 210 upon receipt. For example, access node 120 can parse request 210 and interpret various elements of request 210 for carrying out the request. According to an exemplary embodiment, access node 120 interprets request 210 by inspecting information that is provided in layer 4 or layer 7 of the data packets that constitute request 210. Layer 4 and layer 7 refers to the OSI model for Open Systems Interconnection, with layer 4 representing the transport layer, which may include TCP or UDP protocols, for example, while layer 7 represents the application layer, which includes the HTTP protocol, for example. It should be apparent that access node 120 may inspect the data packets at any particular layer of the OSI model, or provide no inspection at all. In addition, access node 120 may be responsive to any typical protocol used in a packet switched network in addition or as an alternative to the above-mentioned protocols. As a result of inspecting the data packets in request 210, access node 120 can determine if the requested object segments are resident in transparent cache database 128, as indicated in an operation 211. If the object segments are located in transparent cache database 128, access node 120 may generate a HIT message to indicate that the object was found.

In accordance with the present disclosure, access node 120 forwards the original request 212, which may be an HTTP object request, to core node 140, so that access node 120 does not provide TCP termination of request 210. In addition, all the features of request 210 that are submitted by client 110, such as authentication information, tracking of processes or usage data, or any other data that might be expected by server 150 for implementing an application or responding to object requests, can be preserved.

As part of the processing of request 210, access node 120 may obtain a URL from request 210, which is then used to search transparent cache database 128 for the requested object segments. If at least one object segment is found, a HIT message is generated by access node 120 and sent to core node 140 to indicate that transparent cache database 128 has a copy of the requested object segment. The HIT message can be included in a control message 214 forwarded to core node 140, where communication between access node 120 and core node 140 may be proprietary or private, which can be assisted by providing control message 214 as a proprietary message format or using a proprietary protocol. Control message 214 may be provided as a proprietary binary message, for example, which may be formed or interpreted using specialized software in access node 120 and core node 140. In addition to forwarding request 212 and control message 214, access node 120 may update request/response list 126 to make note of the receipt of request 210 and/or the forwarding of request 212. Access node 120 may later inspect request/response list 126 to match a corresponding response with request 210 or request 212 to verify that an expected response was received. In addition, or alternately, Access node 120 may update entries in request/response list 126 to reflect specific object segments identified in a response from server 150.

Core node 140 receives request 212 and forwards request 216 to server 150. Core node 140 may update request/response list 146 to reflect receipt of request 212 and/or forwarding of request 216. Core node 140 forwards request 212 as request 216 without providing TCP termination to contribute to communication transparency between client 110 and server 150.

Core node 140 also receives control message 214, which indicates that at least one object segment of the requested object is resident in transparent cache database 128 of access node 120. Upon receipt of control message 214, core node 140 can record identifiers for the object segments that are the subject of the request, including the object segments that are present in transparent cache database 128. According to an exemplary embodiment, upon receipt of control message 214, core node 140 updates request/response list 146 to set a flag or record object segment identifiers for the list entry corresponding to request 212. The setting of a flag may be implemented by setting a bit in the entry representing request 212, for example. The object segment identifiers can be listed with a given entry in request/response list 146 that corresponds with request 212. It should be apparent that core node 140 can memorialize receipt of control message 214 to indicate that the requested object segments that are resident in transparent cache database 128. Accordingly, the control information provided by control message 214 is saved at core node 140, as indicated with an operation 218. The saved control information is used to control the data transmitted from core node 140 to access node 120 in response to the request 210 from client 110.

Request 216 arrives at server 150, which provides TCP termination for request 210 originated at client 110. Server 150 processes request 216 and generates a response 220 that provides fulfilment for at least some of the requested object segments by transmitting object data in response 220, which may be an HTTP GET object response that includes a first TCP segment, as illustrated in FIG. 2. Request/response diagram 200 illustrates a portion 222 of the retrieved object that is forwarded to core node 140 with response 220. Response 220 may thus include a number of packets that carry payloads that represent object data corresponding to portion 222 that is delivered to core node 140.

Upon receiving response 220, core node 140 inspects request/response list 146 to match response 220 with a corresponding entry, which entry may represent previous request 212 and/or control message 214 that was/were previously processed at core node 140. Upon matching response 220 to a previously recorded request in request/response list 146, core node 140 inspects the flag or indication previously set in association with the recorded request to determine if the object data in response 220 is already present in cache database 128 at access node 120. For example, core node 140 may inspect a bit flag in the entry in request/response list 146 that refers to the previously recorded request to determine if the object segments returned from server 150 are available in transparent cache database 128. Alternately, or in addition, core node 140 may inspect an entry in request/response list that corresponds to response 220 for object segment identifiers to determine how the object segments should be processed.

For example, if the object segments are identified as being already available in transparent cache database 128, core node 140 can compress those object segments of response 220, and leave the remaining object segments of response 220 in an uncompressed state. The compression of response 220 implemented by core node 140 replaces the HTTP payload with an object index or pointer, for example, as indicated in operation 224.

According to an exemplary embodiment of the present disclosure, the compression process implemented by core node 140 inspects each of the object segments of portion 222 that are indentified in response 220 to determine index or pointer information for the object segments in the object data. The index or pointer information that describes each of the object segments in response 220 are preserved by core node 140. These index or pointer values are used to reference the object segments located in transparent cache database 128, so that the same object segments that are provided from server 150 can be reconstituted from the object data that is stored in transparent cache database 128. Core node 140 replaces the HTTP payload in response 220 with the index or pointer information, which significantly decreases the size of response 220, since a majority of data representing portion 222 is removed and reduced to the index or pointer information used to reference the object data in transparent cache database 128 upon return of the response to access node 120. It should be apparent that any type of object reference information may be used for the compression, including such items as an object name/URL, size and/or offset into the object data or portions of the object data, or object segment identifiers, all of which is collectively referred to herein as metadata.

Once core node 140 has replaced the object segments to be compressed in the HTTP payload of response 220 with the index or pointer information for the object segments of portion 222, a response 226 can be generated for transmission to access node 120. Response 226 represents a significantly smaller size than response 220, even if response 226 includes uncompressed object segments, due to having had at least some of the HTTP payload replaced with the compressed data referencing the object segments of portion 222. Accordingly, response 226 can be sent from core node 140 to access node 120 with significantly reduced bandwidth requirements, thereby conserving bandwidth of a communication link between core node 140 and access node 120.

In addition, core node 140 can implement a packet multiplexer that compacts the information for a number of packets into a single packet transmission. Such a packet multiplexer system is described in a publication identified as European Patent EP 1 495 612 B1 by Philips, et al., having an application filing date of Apr. 3, 2003, and entitled METHOD AND APPARATUS FOR EFFIECIENT TRANSMISSION OF VOIP TRAFFIC, the entire contents of which are hereby incorporated herein by reference. Multiplexing packets in accordance with the above noted publication further conserves bandwidth for the connection between core node 140 and access node 120, since a number of small packets can be condensed into a single packet for transmission from core node 140 to access node 120. For example, a typical packet size of 1500 bytes may have a header size of 80 bytes, leaving 1420 bytes for a payload. In accordance with the compression operation described above that is performed by core node 140, the 1420 bytes of the payload can be compressed into 20 bytes, so that the overall size of the packet is 100 bytes, which include 80 bytes for the header and 20 bytes for the payload. If a 100 byte packet is multiplexed with a number of other like packets, it might be possible to provide fourteen 100 byte packets in the payload section of an ordinary sized packet with a payload size of approximately 1420 bytes. The packets carried in the multiplexed packet are demultiplexed at a destination, such as access node 120, where each of the condensed packets can be retrieved from the multiplexed packet to restore their original individual packet status. Upon restoration of each of the constituent packets that were delivered via the multiplexed packet, access node 120 can reconstitute the object segments that were originally provided in the HTTP payload in each packet representing response 220 from server 150.

Access node 120 decompresses response 220 by demultiplexing the packets making up response 226, and by reconstituting the compressed object segments in the HTTP payloads of each of the packets using the object data stored in transparent cache database 128. Access node 120 uses the index or pointer information that is substituted into the HTTP payload of each of the restored packets to reference the corresponding object segments that are stored in transparent cache database 128. The referenced object segments are retrieved from transparent cache database 128 and substituted into the HTTP payload of the packets in response 226 to rebuild the object data that was compressed at core node 140. Accordingly, access node 120 indexes into the object data stored in transparent cache database 128 in accordance with the index or pointer information provided by the compression process employed at core node 140 to identify the compressed object segments that are to be retrieved and reconstituted into the packets derived from response 226, as illustrated in operation 228 at access node 120.

The reconstituted packets with the restored object segments are sent to client 110 in response 230. Client 110 thus receives the requested object data in response 230, in the form of one or more packets that carry the object data as payload. Each of the packets that client 110 receives appear to originate from server 150, since the packet information provided in response 220 is preserved through the compression of the object data, as well as through the condensing of packets in the packet multiplexing operation. Accordingly, from the perspective of client 110, request 210 appears to have reached server 150, causing a response to be generated that includes the requested object data, which appears to client 110 to have been returned from server 150 to client 110 in response 230. Accordingly, the communication between client 110 and server 150 appears to be transparent with regard to access node 120 and core node 140, since the contents of response 220 is forwarded to server 150, and the apparent content of response 220 is delivered to client 110. With this configuration, server 150 provides TCP termination for requests made by client 110, so that any functionality that is intended to be carried out or processed by server 150 in response to request from client 110 is maintained. At the same time, the bandwidth requirements for object data transmitted from core node 140 to access node 120 is significantly reduced.

In keeping with the above discussion, server 150 provides a further response 232 that includes a portion 234 of the requested object data. Response 232 is forwarded to core node 140 where compression operation 224 is again performed, as described above, to produce response 236 that is delivered from core node 140 to access node 120 with reduced bandwidth requirements. Access node 120 performs operation 228 to reconstitute portion 234 from transparent cache database 128 in the same manner as described above. The reconstituted packets representing the segments of the object data constituting portion 234 are sent to client 110 in response 240 to complete retrieval of the object to client 110 in response to request 210

Figure 3:
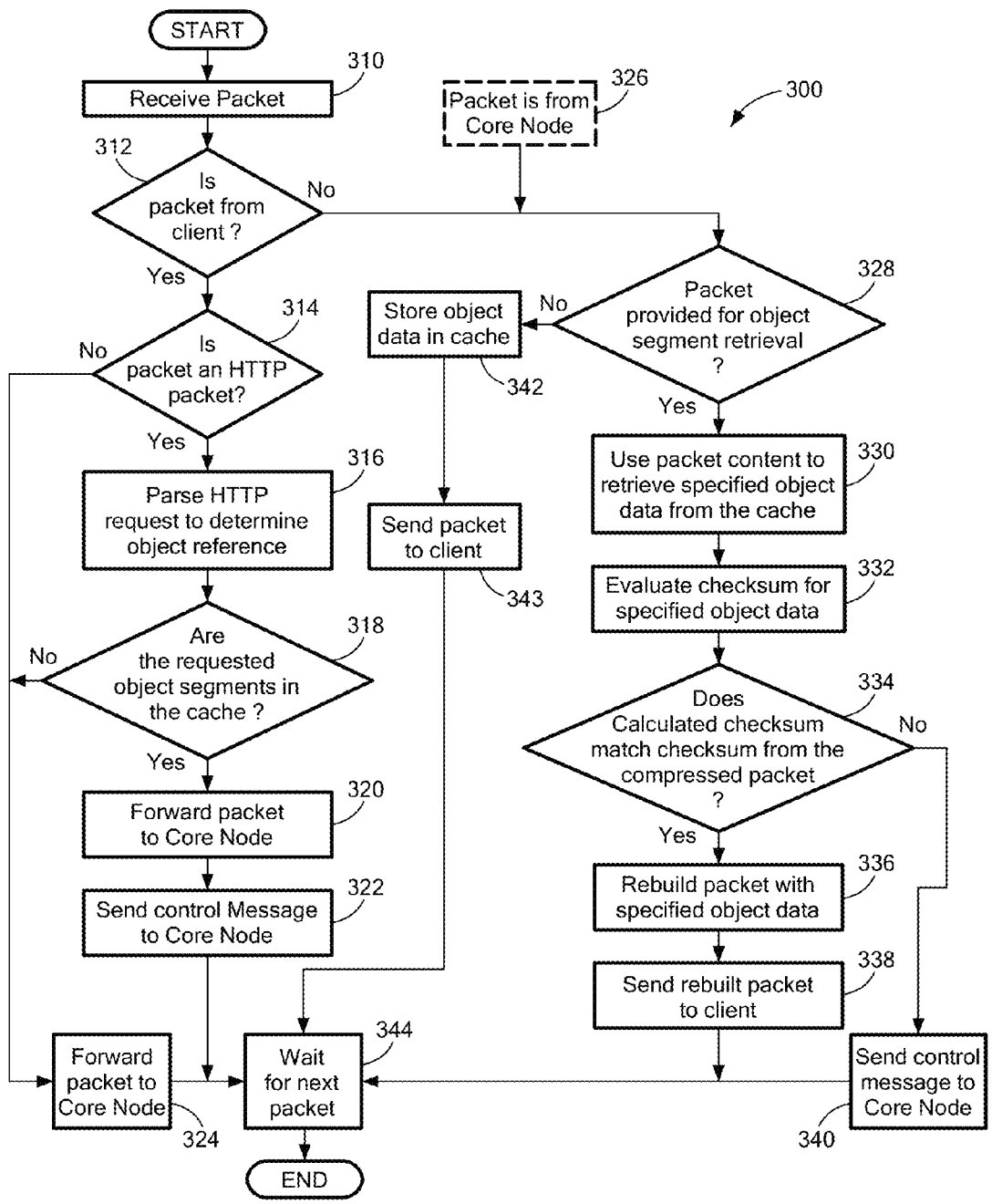
FIG. 3 is a flowchart illustrating operations at an access node according to an exemplary embodiment of the present disclosure.

Referring also now to FIG. 3, a flowchart 300 illustrates processes carried out at access node 120. Access node 120 receives a packet, as illustrated in block 310, and determines if the packet is from client 110, as illustrated in decision block 312. If the packet is from client 110, access node 120 tests if the packet is an HTTP packet, as illustrated in decision block 314 that is reached via the Yes branch from decision block 312. If the packet is an HTTP packet, access node 120 parses the HTTP request to determine if the request is for an object, as illustrated in block 316 that is reached via the Yes branch of decision block 314. The HTTP request parsing can be based on inspection of one or more packets constituting the request with respect to level 4 or level 7 of the OSI model for Open Systems Interconnection, for example.

Access node 120 checks to see if the object, or portions thereof, referred to in the HTTP request is(are) stored in transparent cache database 128, as illustrated in decision block 318. The packet is forwarded to core node 140, and core node 120 generates a control message that indicates the results of searching transparent cache database 128 for the object or object portions. Access node 120 sends the control message to core node 140, as is illustrated in blocks 320 and 322 that are reached via the Yes branch of decision block 318. The control message is used to inform core node 140 of any object segments that are stored in transparent cache database 128, so that core node 140 can take appropriate action with the response from server 150, such as by compressing object segments that are already located in transparent cache database 128.

If access node 120 determines that the requested object or object portions are not in transparent cache database 128, the packet is forwarded to core node 140 without any subsequent control messages, which is illustrated in block 324 being reached via the No branch of decision block 318. Although not shown, access node 120 may also or alternately send a control message to core node 140 indicating that none of the requests object segments were found in transparent cache database 128. If access node 120 determines that the received packet is not an HTTP packet, access node 120 forwards the packet to core node 140 without further processing, as illustrated in block 324 being reached via the No branch of decision block 314. Once access node 120 processes the received request as described above, more packets can be processed, as is illustrated in block 344 where access node 120 waits for further incoming packets.

If access node 120 determines that the received packet is from core node 140, as noted in comment block 326, access node 120 determines if the packet is provided for object retrieval, as illustrated in decision block 328 being reached via the No branch from decision block 312. In such an instance, the packet received from core node 140 includes information for retrieving object data from transparent cache database 128, such as a checksum value, a range of packet data, processing treatment, such as object retrieval, an object ID and/or a range of segments of the object that the packet represents.

If the packet includes an indication for object retrieval, access node 120 retrieves object data from transparent cache database 128, as is illustrated in block 330 being reached via the Yes branch of decision block 328. Access node 120 calculates a checksum value for the object data retrieved from transparent cache database 128, as illustrated in block 332. Access node 120 compares the checksum value provided in the packet with the calculated checksum value for the object data retrieved from transparent cache database 128, as is illustrated in decision block 334. If the checksums match, access node 120 rebuilds the packet with specified object data retrieved from transparent cache database 128, as illustrated in block 336 being reached via the Yes branch of decision block 334. The rebuilt packet is sent to client 110, as is illustrated in block 338. If the checksums do not match, access node 120 notifies core node 140 by sending a control message to core node 140, as is illustrated in block 340. The control message sent by access node 120 can indicate that there was a "retrieve error" in attempting to fulfill the client request, meaning that the object data retrieved from transparent cache database 128 did not match the expected value indicated by the checksum provided with the received packet. Such an error can occur, for example, if the object data in transparent cache database 128 is no longer current, or is corrupted. Once the control message is sent from access node 120 to core node 140, access node 120 prepares to process a new packet, as is illustrated in block 344.

If access node 120 determines that the packet does not include an indication for object retrieval, the object data provided with the packet is stored in transparent cache database 128, as illustrated in block 342 being reached via the No branch of decision block 328. The packet in which the object data is so provided is a normal packet, e.g., an uncompressed packet, and is provided to client 110, as is illustrated in block 343. Access node 120 then prepares to process a new packet, as illustrated in block 344.

Figure 4:
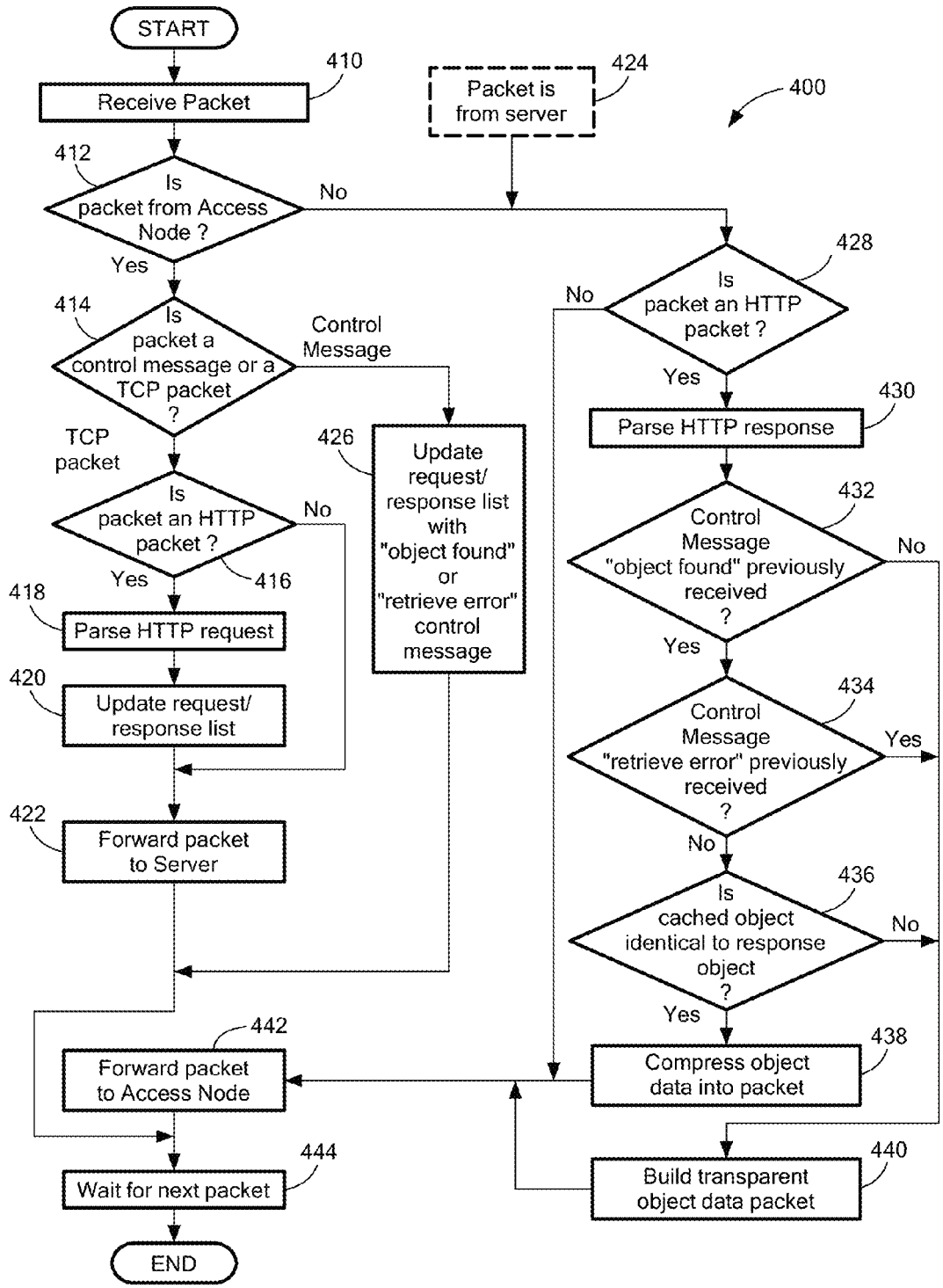
FIG. 4 is a flowchart illustrating operations at a core node according to an exemplary embodiment of the present disclosure.

Referring also now to FIG. 4, a flowchart 400 illustrates processes carried out at core node 140. Core node 140 receives a packet, as illustrated in block 410, and determines if the packet is from access node 120, as illustrated in decision block 412. If the packet is from access node 120, core node 140 tests if the packet is a control message or a TCP packet, as is illustrated in decision block 414 being reached via the Yes branch of decision block 412.

If core node 140 determines that the packet is a control message, core node 140 updates request/response list 146 with a flag or object segment identifiers to indicate the type of control message that was received, as is illustrated in block 426 being reached via the control message branch of decision block 414. For example, the control message may include an "object found" descriptor or a "retrieve error" descriptor, which prompts core node 140 set an appropriate flag or record object segment identifiers in a corresponding entry of request/response list 146. Once a response is received from server 150 and matched against a corresponding entry in request/response list 146, any flags or identifiers for that entry are evaluated to determine how core node 140 should process the response. As discussed in greater detail below, a flag associated with the "retrieve error" descriptor may cause core node 140 to construct a transparent object data packet that contains uncompressed object data for transmission to access node 120. The flag or identifiers associated with the "object found" descriptor may cause core node 140 to construct a compressed data packet that includes references to object segments, rather than including the object data itself. Once core node 140 updates request/response list 146 in accordance with the received control message, core node 140 prepares for processing another packet, as is illustrated with block 444.

If core node 140 determines that the packet is a TCP packet, core node 140 tests if the packet is an HTTP packet, as illustrated in decision block 416 that is reached via the TCP packet branch from decision block 414. If the packet is an HTTP packet, core node 140 parses the HTTP request to determine if the request is for an object, as illustrated in block 418 that is reached via the Yes branch of decision block 416. The HTTP request parsing can be based on inspection of one or more packets constituting the request with respect to level 4 or level 7 of the OSI model for Open Systems Interconnection. Core node 140 then updates request/response list 146, as is illustrated in block 420. The packet containing the request from client 110 is then forwarded from core node 140 to server 150, as is illustrated in block 422. Core node 140 then prepares for processing another packet, as is illustrated in block 444. If the packet is determined by core node 140 to be other than an HTTP packet, as is illustrated by the No branch being taken from decision block 416, the packet is forwarded from core node 140 to server 150 without further processing, as is illustrated in block 422. Core node 140 then prepares for processing another packet, as is illustrated in block 444.

If core node 140 determines that the packet represents a control message received from access node 120, core node 140 updates request/response list 146 in accordance with a content of the control message. For example, the control message may include a descriptor of "object found" to indicate that the requested object was located in transparent cache database 128. Alternately, or in addition, the control message may include a descriptor of the object segments that were located in transparent cache database 128. This type of control message can be used to inform core node 140 which object data returned in a response from server 150 should be compressed prior to being sent to access node 120. The control message may include a descriptor of "retrieve error" to indicate that an error occurred in attempting to retrieve object data from transparent cache database 128. The "retrieve error" descriptor in the control message can result from a failed attempt to reconstitute object data that was compressed for transmission from core node 140 to access node 120, for example. Core node 140 then prepares for processing another packet, as is illustrated in block 444.

If core node 140 determines that the received packet is from server 150, as noted in comment block 424, core node 140 determines if the packet is an HTTP packet, as illustrated in decision block 428 that is reached via the No branch from decision block 412. If the packet is an HTTP packet, core node 140 parses the HTTP response as is illustrated in block 430. Once the HTTP response is parsed, core node 140 makes several determinations based on previously received control messages and whether the cached object has the same parameters as the response object to indicate that the two objects are identical. These determinations made by core node 140 are illustrated with decision blocks 432, 434 and 436, respectively. Decision block 432 illustrates the determination of whether a control message was previously received that included an "object found" descriptor. Decision block 434 illustrates the determination of whether a control message was previously received that included a "retrieve error" descriptor. Decision block 436 illustrates the determination of whether the cached object is identical to the response object received from server 150. The determination of whether the cached object is identical to the response object can be made by determining if the objects each have the same object type and object length, for example.

If a previously received control message did not contain the "object found" descriptor or did contain the "retrieve error" descriptor, or if the cached object in response object are not the same, core node 140 builds a transparent object data packet that includes uncompressed object data for transmission to access node 120, as is illustrated by the various branches of decision blocks 432, 434 and 436 arriving at block 440. If a previously received control message did contain the "object found" descriptor and did not contain the "retrieve error" descriptor, and if the cached object segments and the response object segments are the same, core node 140 builds a compressed object data packet that includes references to object segments, such as index and/or pointer information used to reference corresponding object data segments of the object data stored in transparent cache database 128. The construction of the compressed object data packet is illustrated in block 438 being reached via the various branches of decision blocks 432, 434 and 436. Core node 140 then forwards the constructed packet to access node 120, as is illustrated in block 442, and then prepares to process another packet, as is illustrated in block 444.

If core node 140 determines that the received packet is not an HTTP packet, as is illustrated with the No branch being taken from decision block 428, the packet is forwarded from core node 142 access node 120 without further processing, as is illustrated in block 442. Core node 140 then prepares for processing another packet, as is illustrated in block 444.

The above described processes used to implement the systems and methods of the present disclosure attain a number of advantages, including reducing bandwidth that is used to transmit requested object data from core node 140 to access node 120. Another advantage is the provision of transparency between server 150 and client 110, which avoids interrupting expected communication between the two components when processing requests and responses. The determination of whether to compress object data provided in a server response is advantageously implemented using existing request/response list 146 with entries that can be appropriately flagged to indicate to core node 140 what action should be taken for processing the server response.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A network component for processing object data requests generated by a client and directed to a server, the network component including an interface and being communicatively interposed between the client and the server, comprising:
    a transparent cache database for storing object data at a location that is physically relatively near the client;
    a processor communicatively coupled to a memory and operative to execute instructions stored in the memory to:
        receive a request for object data generated by the client and directed to the server;
        make a first determination whether the requested object data is located in the transparent cache database;
        forward the request toward the server;
        forward a control message to a network node communicatively interposed between the network component and the server, the control message including an indication of the first determination;
        receive a response from the network node that includes a representation of at least some of the object data;
        make a second determination whether the at least some of the object data is in a compressed state;
        process the response to obtain the at least some of the object data in an uncompressed state based on the second determination using one or more of the representation in the response and the requested object data located in the transparent cache database; and
        forward the at least some of the object data in the uncompressed state to the client.

2. The network component according to claim 1, wherein the first determination is made in accordance with an inspection of at least one of a transport layer or an application layer of an open systems interconnection model.

3. The network component according to claim 1, wherein the processor is further operative to avoid terminating the request at the network component.

4. The network component according to claim 1, wherein the control message is implemented in accordance with one or more of a custom format or protocol.

5. The network component according to claim 1, wherein the control message further indicates an error condition with respect to the object data in the transparent cache database.

6. The network component according to claim 1, wherein the representation includes a reference to a segment of the object data retrieved from the server.

7. The network component according to claim 6, wherein the reference is one or more of an index or an offset into the object data.

8. The network component according to claim 6, wherein the processor is further operative to restore the at least some of the object data to an uncompressed state by using the reference to locate a segment of the object data in the transparent cache database that corresponds to the segment of the object data retrieved from the server.

9. The network component according to claim 1, wherein the processor is further operative to calculate a checksum for at least some of the object data located in the transparent cache database that corresponds to the at least some of the object data represented in the response.

10. The network component according to claim 9, wherein the processor is further operative to compare the calculated checksum to a checksum received with the response.

11. The network component according to claim 1, further comprising the processor being operative to demultiplex packets included in the response from the network node.

12. A network component for processing object data requests generated by a client and directed to a server, the network component including an interface and being communicatively interposed between the client and the server, comprising:
 a request/response list for tracking requests and associated responses;
 a processor communicatively coupled to a memory and operative to execute instructions stored in the memory to:
  forward a request for object data to the server;
  receive a control message from a network node communicatively interposed between the client and the network component, the control message including an indication of one or more of a presence or status of object data located at the network node;
  update an entry in the request/response list that corresponds to the forwarded request in accordance with the indication included in the control message;
  receive a response from the server that includes object data requested by the client;
  make a determination whether to compress the object data included in the response in accordance with the updated entry in the request/response list;
  process the response in accordance with the determination; and
  forward the processed response to the network node.

13. The network component according to claim 12, wherein the response is processed in accordance with the determination to compress the object data.

14. The network component according to claim 12, wherein the update to the entry in the request/response list further comprises setting a flag to indicate that the response is to be compressed.

15. The network component according to claim 12, wherein the response is processed in accordance with the determination not to compress the object data.

16. The network component according to claim 12, wherein the update to the entry in the request/response list further comprises setting a flag to indicate that the response is not to be compressed.

17. The network component according to claim 15, wherein the indication included in the control message represents an error condition for the object data located at the network node.

18. The network component according to claim 13, wherein the indication included in the control message represents the presence of the object data located at the network node.

19. The network component according to claim 13, wherein the processor is further operative to compress the object data by generating references to segments of the object data, which references are substituted for the segments of the object data in the response.

20. The network component according to claim 12, wherein the processor is further operative to multiplex constituent packets of the response.

21. A system for providing transparency between a client and a server in a communication network in which the bandwidth used for responses provided from the server to the client is reduced, comprising:
 a first network node that includes a transparent cache database;
 a second network node;
 the first and the second network nodes being communicatively interposed between the client and the server and being communicatively coupled to each other;
 the first network node being operative to forward a request for object data from the client to the server;
 the first network node being further operative to forward a control message to the second network node, the control message including an indication of one or more of a presence or status of the object data in relation to the transparent cache database;
 the second network node being operative to receive a response from the server that includes the requested object data;
 the second network node being further operative to make a determination whether to compress the object data received in the response from the server in accordance with the indication included in the control message; and
 the second network node being further operative to process the response in accordance with the determination and to forward the processed response to the first network node.

22. A method of a network component implemented by a processor executing instructions from a communicatively coupled memory to process object data requests generated by a client and directed to a server, comprising:
 receiving a request for object data generated by the client and directed to the server;
 making a first determination whether the requested object data is located in a transparent cache database;
 forwarding the request toward the server;
 forwarding a control message to a network node communicatively interposed between the network component and the server, the control message including an indication of the first determination;
 receiving a response from the network node that includes a representation of at least some of the object data;
 making a second determination whether the at least some of the object data is in a compressed state;
 processing the response to obtain the at least some of the object data in an uncompressed state based on the second determination using one or more of the representation in the response and the requested object data located in the transparent cache database; and
 forwarding the at least some of the object data in the uncompressed state to the client.

23. A method of a network component implemented by a processor executing instructions from a communicatively coupled memory to process object data requests generated by a client and directed to a server, comprising:
 forwarding a request for object data to the server;
 receiving, at the network component, a control message from a network node communicatively interposed between the client and the network component, the control message including an indication of one or more of a presence or status of object data located at the network node;

updating an entry in a request/response list that corresponds to the forwarded request in accordance with the indication included in the control message;
receiving a response from the server that includes object data requested by the client;
making a determination whether to compress the object data included in the response in accordance with the updated entry in the request/response list;
processing the response in accordance with the determination; and
forwarding the processed response to the network node.

24. A network component for processing object data requests generated by a client and directed to a server, the network component being communicatively coupled between the client and the server, the network component comprising:
a cache database;
a memory; and
a processor communicatively coupled to the memory and operative to execute instructions stored in the memory:
to receive a request for specific object data from the client;
to forward the request to a network node communicably coupled between the network component and the server;
to make a determination as to whether corresponding object data is stored in the cache database;
to forward, to the network node, a control message that includes a first indication of the determination;
to receive, from the network node, a response to the request that includes at least some of the specific object data, the at least some of the specific object data being received at the network node from the server, the at least some of the specific object data having been compressed at the network node based on the first indication included in the control message;
to decompress the at least some of the specific object data included in the response using the corresponding object data stored in the cache database; and
to forward the at least some of the specific object data to the client.

25. The network component of claim 24 wherein the processor is further operative to execute the instructions stored in the memory:
to forward, to the network node, the control message including a second indication of what portion of the specific object data is included in the corresponding object data stored in the cache database; and
to receive, from the network node, the response to the request including the at least some of the specific object data that corresponds to a remaining portion of the specific object data that is not stored in the cache database.

26. The network component of claim 25 wherein the processor is further operative to execute the instructions stored in the memory:
to decompress the remaining portion of the specific object data included in the response using the portion of the specific object stored in the cache database.

27. A method of a network component implemented by a processor executing instructions from a memory to process requests for object data generated by a client and directed to a server, the network component including a cache database, the method comprising:
receiving a request for specific object data from the client;
forwarding the request to a network node communicably coupled between the network component and the server;
making a determination as to whether corresponding object data is stored in the cache database;
forwarding, to the network node, a control message that includes a first indication of the determination;
receiving, from the network node, a response to the request that includes at least some of the specific object data, the at least some of the specific object data being received at the network node from the server, the at least some of the specific object data having been compressed at the network node based on the first indication included in the control message;
decompressing the at least some of the specific object data included in the response using the corresponding object data stored in the cache database; and
forwarding the at least some of the specific object data to the client.

28. The method of claim 27 wherein the forwarding of the control message includes forwarding, to the network node, the control message including a second indication of what portion of the specific object data is included in the corresponding object data stored in the cache database, and wherein the receiving of the response to the request includes receiving, from the network node, the response to the request including the at least some of the specific object data that corresponds to a remaining portion of the specific object data that is not stored in the cache database.

29. The method of claim 28 wherein the decompressing of the at least some of the specific object data includes decompressing the remaining portion of the specific object data included in the response using the portion of the specific object stored in the cache database.

30. A network component for processing requests for object data generated by a client and directed to a server, the network component being communicatively coupled between the client and the server, the network component comprising:
a memory; and
a processor communicatively coupled to the memory and operative to execute instructions stored in the memory:
to receive a request for specific object data from a network node communicatively coupled between the client and the network component;
to forward the request to the server;
to receive a control message from the network node, the control message including an indication of one or more of a presence and a status of corresponding object data cached at the network node;
to receive, from the server, a response to the request that includes at least some of the specific object data;
to make a determination as to whether to compress the at least some of the specific object data included in the response in accordance with the indication included in the control message;
to process the at least some of the specific object data included in the response in accordance with the determination; and
to forward the at least some of the specific object data to the network node.

31. The network component of claim 30 wherein the processor is further operative to execute the instructions stored in the memory:
in the event the indication included in the control message indicates the presence of the corresponding object data cached at the network node, to compress the at least some of the specific object data included in the response; and to forward the at least some of the specific object data in a compressed state to the network node.

32. The network component of claim 30 wherein the memory is operative to store a request/response list for tracking requests and associated responses, and wherein the processor is further operative to execute the instructions stored in the memory:
   to update an entry in the request/response list that corresponds to the forwarded request in accordance with the indication included in the control message; and
   to make a further determination as to whether to compress the at least some of the specific object data included in the response in accordance with the updated entry in the request/response list.

33. A method of a network component implemented by a processor executing instructions from a memory to process requests for object data generated by a client and directed to a server, the method comprising:
   receiving a request for specific object data from a network node communicatively coupled between the client and the network component;
   forwarding the request to the server;
   receiving a control message from the network node, the control message including an indication of one or more of a presence and a status of corresponding object data cached at the network node;
   receiving, from the server, a response to the request that includes at least some of the specific object data;
   making a determination as to whether to compress the at least some of the specific object data included in the response in accordance with the indication included in the control message;
   processing the at least some of the specific object data included in the response in accordance with the determination; and
   forwarding the at least some of the specific object data to the network node.

34. The method of claim 33 further comprising:
   in the event the indication included in the control message indicates the presence of the corresponding object data cached at the network node, compressing the at least some of the specific object data included in the response; and
   forwarding the at least some of the specific object data in a compressed state to the network node.

35. The method of claim 33 wherein the memory is operative to store a request/response list for tracking requests and associated responses, and wherein the method further comprises:
   updating an entry in the request/response list that corresponds to the forwarded request in accordance with the indication included in the control message; and
   making a further determination as to whether to compress the at least some of the specific object data included in the response in accordance with the updated entry in the request/response list.

* * * * *